May 26, 1925.
A. D. HARMON
MOISTENING DEVICE
Filed May 23, 1924
1,539,560
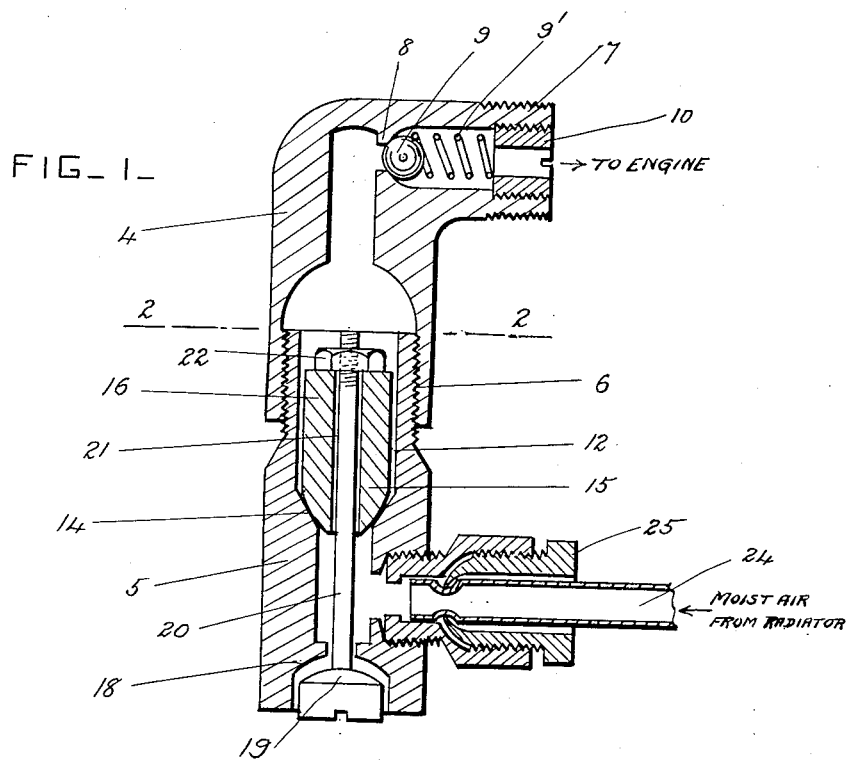
FIG_1_
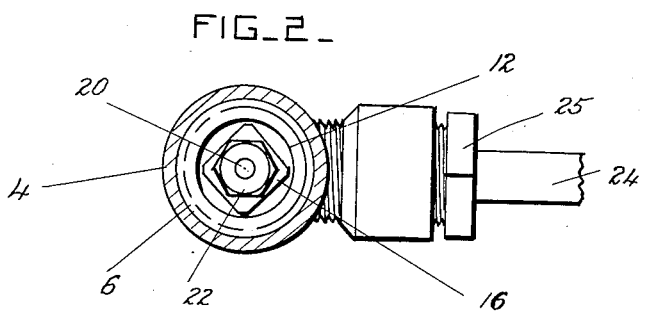
FIG_2_
Inventor
Alton D. Harmon
by Herbert W. P. Jenner
Attorney Patented May 26, 1925.

1,539,560

UNITED STATES PATENT OFFICE.

ALTON D. HARMON, OF ERIE, PENNSYLVANIA.

MOISTENING DEVICE.

Application filed May 28, 1924. Serial No. 716,433.

*To all whom it may concern:*

Be it known that I, ALTON D. HARMON, a citizen of the United States, residing at Erie, in the county of Erie and State of Pennsylvania, have invented certain new and useful Improvements in Moistening Devices, of which the following is a specification.

This invention relates to attachments for the cylinders of internal combustion engines, for moistening the combustible charges; and it consists in the novel construction and combination of the parts herinafter fully described and claimed whereby the moisture is admitted freely and automatically when the speed of the engine is increased beyond a predetermined limit.

In the drawings, Figure 1 is a vertical section through a moistening attachment constructed according to this invention. Fig. 2 is a cross-section taken on the line 2—2 in Fig. 1. These figures show the device drawn to an enlarged size, for clearness.

A casing is provided and is formed of two parts 4 and 5 secured together by screw-threaded portions 6 or any other approved fastenings. The upper part 4 is preferably angle-shaped in form, but it may be straight if desired, and it has a screwthreaded end portion 7 which is adapted to be screwed into the intake manifold of the engine, or connected to it by any suitable pipe. The upper part 4 of the casing has a valve seat 8 formed in it, and 9 is the delivery valve which is held to the seat 8 by a helical spring 9'. The valve 9 is preferably a ball valve, and the spring is held in engagement with it by a tubular plug 10 which is screwed into the outlet end portion of the casing.

The lower part 5 of the casing has a guide 12, and a valve seat 14 below the guide. The air inlet valve 15 normally closes the passage through the valve seat 14, and its upper part 16 is square in cross-section, or is otherwise formed so that it slides freely in the guide 12, and permits moistened air to be drawn upwardly through the casing. The valve 15 is plug-shaped and heavy, and is closed by gravity.

A second valve seat 18 is formed in the lower end portion of the lower part 5 of the casing, and 19 is a drip valve for closing the passage through the valve seat 18. The drip valve 19 has a stem 20 which projects through a hole 21 in the inlet valve 15, and 22 is a nut screwed on the projecting portion of the stem 20 above the air valve 15, and connecting the drip valve to it. The relative position of the two valves is adjusted by turning the nut 22. The nut 22 is screwed tightly on the stem, or is otherwise locked so as to prevent it from working off acidentally, and the stem 20 is arranged loosely in the hole 21 so that it and the valve 15 can always move very freely and quickly independently of each other, and not be liable to stick together.

The inlet pipe 24 for moisture is connected at one end to the upper part of the radiator, or to any other similar source of steam or aqueous vapor. The other end of the pipe 24 is connected with the annular space in the casing around the valve stem 20, and between the valves 15 and 19, by means of a union 25 of any approved construction.

When the engine is running at a predetermined slow speed, or is not running, the steam and vapor, which is condensed in the pipe 24 and in the casing below the air inlet valve, is permitted to drip out of the pipe and casing by the drip valve. The delivery valve 9 is provided so that the device will not hinder the starting of the engine. The strength of the spring 9' is arranged so that the valve is not opened while the engine is being moved slowly in the act of starting it. The closed valve 9 prevents air from being drawn into the engine cylinder to weaken the strong charge which is required in starting. When the engine begins to work, and is running slowly, the reduction of pressure or suction in the engine manifold opens the valve 9 and closes the drip valve 19. When the engine attains a predetermined speed the increased suction raises the heavy valve 15 and admits moist air or steam through the pipe 24. The valve 19 is normally raised before the valve 15, by the suction above the top of its stem and its supporting device or nut 22, which can be made of any size to produce the best effect. The moist air valve and the drip valve may rise together when the engine is working very fast, and some air may be admitted through the drip valve, but when the engine stops the drip valve always opens automatically when the moist air valve closes. The use of this device on an engine is found to make it work more economically and satisfactorily.

What I claim is:

1. A moistening device, comprising a casing provided at its upper part with an outlet adapted to be connected with an engine, a delivery valve normally closing the said outlet, said casing having also a drip valve seat at its lower part, a moist air valve seat above the drip valve seat, and an inlet for moist air between the valve seats; a moist air valve normally closing the moist air valve seat, and a normally open drip valve for closing the drip valve seat provided with a stem which projects loosely through a hole in the moist air valve.

2. A moistening device, comprising a casing provided at its upper part with an outlet adapted to be connected with an engine, a spring-controlled delivery valve normally closing the said outlet, said casing having also a drip valve seat at its lower part, a moist air valve seat above the drip valve seat, and an inlet for moist air between the seats; a moist air valve normally closing the moist air valve seat, and a drip valve normally operating to close the drip valve seat before the moist air valve is opened, said drip valve being provided with a stem which is slidable in a hole in the moist air valve and a supporting device which normally rests on top of the moist air valve.

3. A moistening device, comprising an inclosing casing, a suction-operated delivery valve, a suction-operated valve for admitting moist air through the casing and delivery valve, and a suction-operated drip valve provided with a stem which is slidable loosely in the moist air valve.

4. A moistening device, comprising an inclosing casing, a suction-operated delivery valve, a suction-operated valve for admitting moist air through the casing and delivery valve, and a drip valve for the casing suspended in it from the moist air valve and opening automatically when the moist air valve closes.

In testimony whereof I have affixed my signature.

ALTON D. HARMON.